United States Patent
Stickler (10) Patent No.: US 7,565,410 B2
(45) Date of Patent: Jul. 21, 2009

(54) DISTRIBUTED NETWORK

(75) Inventor: Patrick Stickler, Tampere (FI)

(73) Assignee: Nokia Corporation, Espoo (FI)

( * ) Notice: Subject to any disclaimer, the term of this patent is extended or adjusted under 35 U.S.C. 154(b) by 1540 days.

(21) Appl. No.: 10/155,240

(22) Filed: May 28, 2002

(65) Prior Publication Data

US 2003/0163548 A1 Aug. 28, 2003

Related U.S. Application Data

(60) Provisional application No. 60/301,418, filed on Jun. 29, 2001.

(30) Foreign Application Priority Data

Jun. 5, 2001 (GB) ................................. 0113680.3

(51) Int. Cl.
*G06F 15/16* (2006.01)
(52) U.S. Cl. ..................... 709/218; 709/238; 709/240; 709/241; 709/243; 707/104.1; 707/E17.013
(58) Field of Classification Search ................ 709/218, 709/201, 205, 209, 239, 238, 240, 241–243, 709/217, 219
See application file for complete search history.

(56) References Cited

U.S. PATENT DOCUMENTS

| 6,167,427 | A | 12/2000 | Rabinovich et al. | ......... 709/201 |
| 6,523,046 | B2 | 2/2003 | Liu et al. | |
| 6,751,646 | B1 * | 6/2004 | Chow et al. | ................. 718/105 |
| 6,804,700 | B1 * | 10/2004 | Terek et al. | ................. 709/203 |

OTHER PUBLICATIONS

Naming Service Specification, Apr. 2000, OMG, Version 1.0 http://www.omg.org.*
Keith Shafer, et al., Introduction to Persistent UniformResource Locators, Jun. 1996, pp. 1-6.

\* cited by examiner

*Primary Examiner*—Yves Dalencourt
(74) *Attorney, Agent, or Firm*—Alston & Bird LLP (57) ABSTRACT

A method and apparatus resolves a symbolic identified to a physical data stream. The method and apparatus is particularly suited to resolving physical datastreams in a dynamic distributed network environment. The symbolic identifier is generated in a process resident on a terminal connected to a network. The physical datastream is resourced by a repository. Resource such as servers capable of performing such a resolution, are organized in a hierarchical relationship.

8 Claims, 6 Drawing Sheets

SELECT A LINK OF INTEREST BELOW:

NEWS  mrn:news.net:europe/soccer
SPORT  mrn:sport.bts.alpha:football/premier league
ENTERTAINMENT  mrn:ents.dvb:payforview:matches

FIG. 7a

ENTER THE ADDRESS IN THE BOX BELOW:

mrn:nokia.net.abc:cn:pdf:text

FIG. 7b

DISTRIBUTED NETWORK

This application claims the benefit of U.S. Provisional Patent Application No. 60/301,418 filed on Jun. 29, 2001.

BACKGROUND OF THE INVENTION

The present invention relates to identifying and locating resources on a distributed network, particularly although not exclusively resources in the form of data streams.

It is well known that within a distributed network such as the Internet, resources may be located anywhere there is storage capacity. In addition, resources may be moved between storage locations, replicated or even deleted. Furthermore, where the structure of the network alters over time through growth in particular, then the lack of fixedness of resources within that structure increases the difficulty imposed on processes making use of those resources.

In an effort to facilitate the use of resources, a widely used approach adopted initially on the Internet has been the provision of Uniform Resource Locators (URL), namely character strings intended to identify a location of a resource within a distributed network. Resources addressable using a URL include but are not limited to documents, files, images and the like. However, it is important to note that the URL points merely to the location of the resource, it is not synonymous with a filename and/or directory location at which the resource is instantiated such as a physical data stream, for example. As a result, there exists the common problem of so-called broken links to resources which result in the process requesting the resource receiving an error message indicating that the resource cannot be located.

One proposal to overcome the problem of a URL pointing to non-existent content is that proposed by Online Computer Library Center Inc. (OCLC) in their Persistent Uniform Resource Locator initiative (PURL) details of which may presently be found at. A PURL takes the format http://purl.oclc.org/data/ and comprises three elements. A protocol element, in this example 'http', a resolver address, in this example 'purl.oclc.org' and finally a name, in this example 'data'. The resolution of an address is carried out by a dedicated resolver or server located at the resolver address which maps the PURL to a corresponding URL which URL is returned to a requesting process. Thus the PURL is intended to be invariant over time whilst the mapped URL may vary. Clearly, there is a responsibility for the resource owner at which the URL points to update the server records whenever necessary.

Nevertheless, despite the presence of this and other similar initiatives distributed networks remain almost exclusively wedded to URL as the mechanism through which processes utilise resources.

BRIEF SUMMARY

Summary of the Invention

Thus, in accordance with one aspect of the preferred embodiments, there is provided a resource locating system for receiving a query from a client process, the system comprising a plurality of resource location servers connected to said network, each server including a query resolution application operable to parse a query to extract resource name and a corresponding management path, a register containing a set of predefined management paths of differing scope and a table binding addresses to resource names of at least some of said management paths, said register further including an address of at least one other, different, resource location server, said address being associated with another one of said predefined management paths, the resolution application being further operable to provide said process with an address corresponding to either a said resource name or a said different, resource location server.

Clearly, because the resources are defined in terms of a management path linkage with a resource can be maintained. The symbolic representation realised by the management path and resource name is therefore a structured name setting out the context for a resource namely the management path, and the name of that resource within the context namely the resource name.

Thus, according to another aspect of the preferred embodiments, there is provided a method of resolving a symbolic identifier to locate a physical data stream, the method comprising parsing a symbolic identifier to obtain a first management path portion of variable domain scope and a second resource name portion and identifying a resource having a domain corresponding to said first portion, said resource providing a mapping between said second portion and a physical data stream.

Indeed by providing a context in terms of a management path which provides different scopes or domains, the present invention, unlike, for example, PURLs where the scope domain is fixed, allows multiple domains to be defined, each domain being the set of all possible resources which can be named in a particular context. Within the context of each domain, it is further provided that only one mapping or binding exists from a name to a corresponding resource. As the resource may be straightforward data or a process such as an executable file, to take just two examples, the name may have attributive or invocative qualities in the sense that resolution of an attributive name provides the resource whereas resolution of an invocation name results in an action brought about by the resource.

By redirecting the process each time, the preferred embodiments facilitate the adoption of the protocols and other measures necessary to ensure secure and confidential transfer of data between the process and the repository on which the resource is located or indeed secure interaction with the resource itself.

In accordance with the further aspect of the preferred embodiments, there is provided a resource location server for connection to a distributed network, the server including a query resolution application operable to parse a query received from said network and thereby extract a resource name and a corresponding management path, a register containing a set of predefined management paths of differing scope and a table binding addresses to resource names of at least some of said management paths, said register further including an address of at least one other, different, resource location server, said address being associated with another one of said predefined management paths, the resolution application being further operable in response to a query to derive an address corresponding to either said resource name or said different resource location server.

Whilst in accordance with a still further aspect of the preferred embodiments, there is provided a method of locating a resource on a distributed network, the method comprising the initial steps of binding an address to a respective resource name associated with a particular management path and storing an address of resource location server associated with a further management path, subsequently receiving a query from said network, parsing said request to obtain a resource name and a corresponding management path, comparing said parsed management path with said particular and further management paths and in accordance with said comparison obtaining a respective one of said associated addresses for inclusion in a response to said query.

BRIEF DESCRIPTION OF THE DRAWINGS

In order to understand the present invention more fully, a number of embodiments thereof will now be described by way of example and with reference to the accompanying drawings, in which.

DETAILED DESCRIPTION OF THE INVENTION

Figure 1:
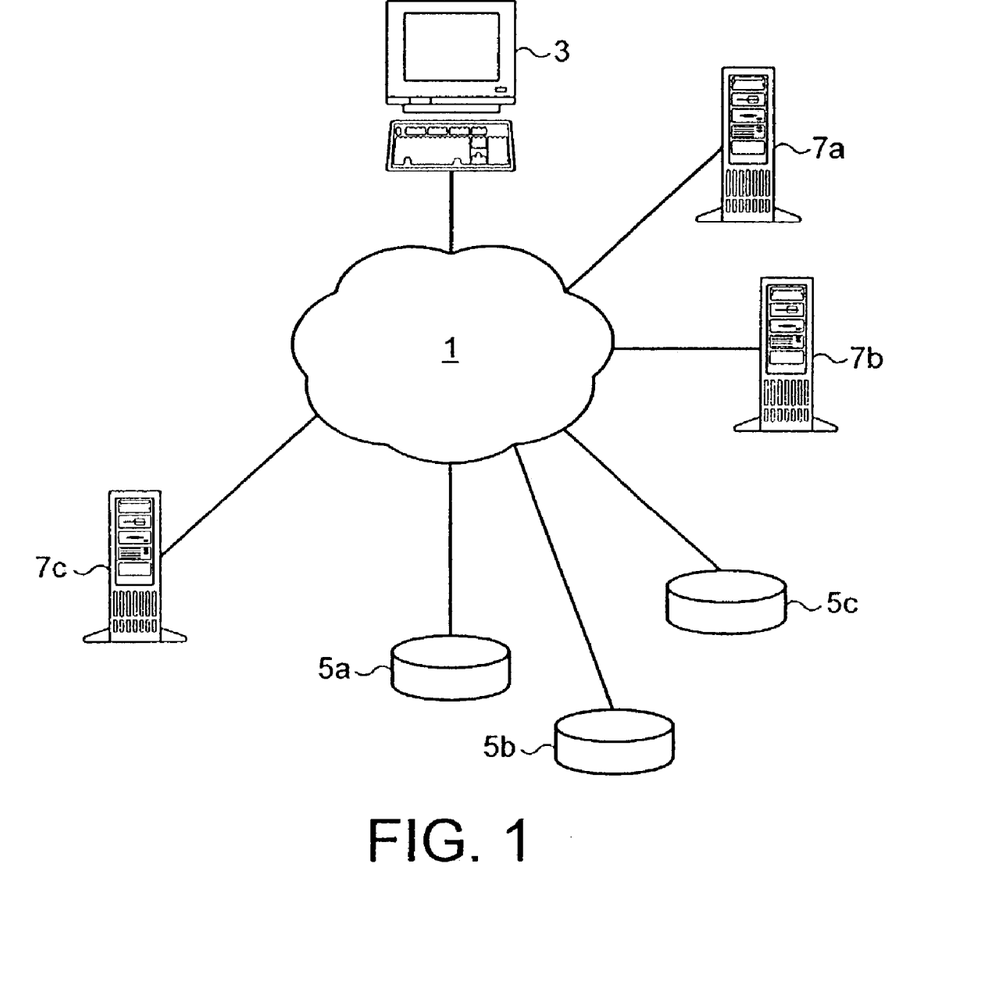
FIG. 1 is a diagrammatic view of a communication network incorporating a plurality of resource location servers in accordance with the invention.

With reference to FIG. 1, there is shown a distributed network 1 to which a terminal 3 is capable of connecting. Further connections exist between the network 1 and independent storage devices or repositories 5a, 5b, 5c and also between the network 1 and a number of Resource Locator Service (RLS) servers 7a, 7b, 7c. The mechanisms and methods by which the various above described equipment connect to the network 1 are well known to those skilled in the art and may included wired and wireless connections and both fixed and mobile equipment.

The repositories 5 each contain resources in the form of files, data streams or the like which may be required by a process operating in the terminal 3. The resources themselves may be stored in any particular manner provided the manner of storage does not prevent access in a consistent manner by processes external to the repository 5.

Figure 2:
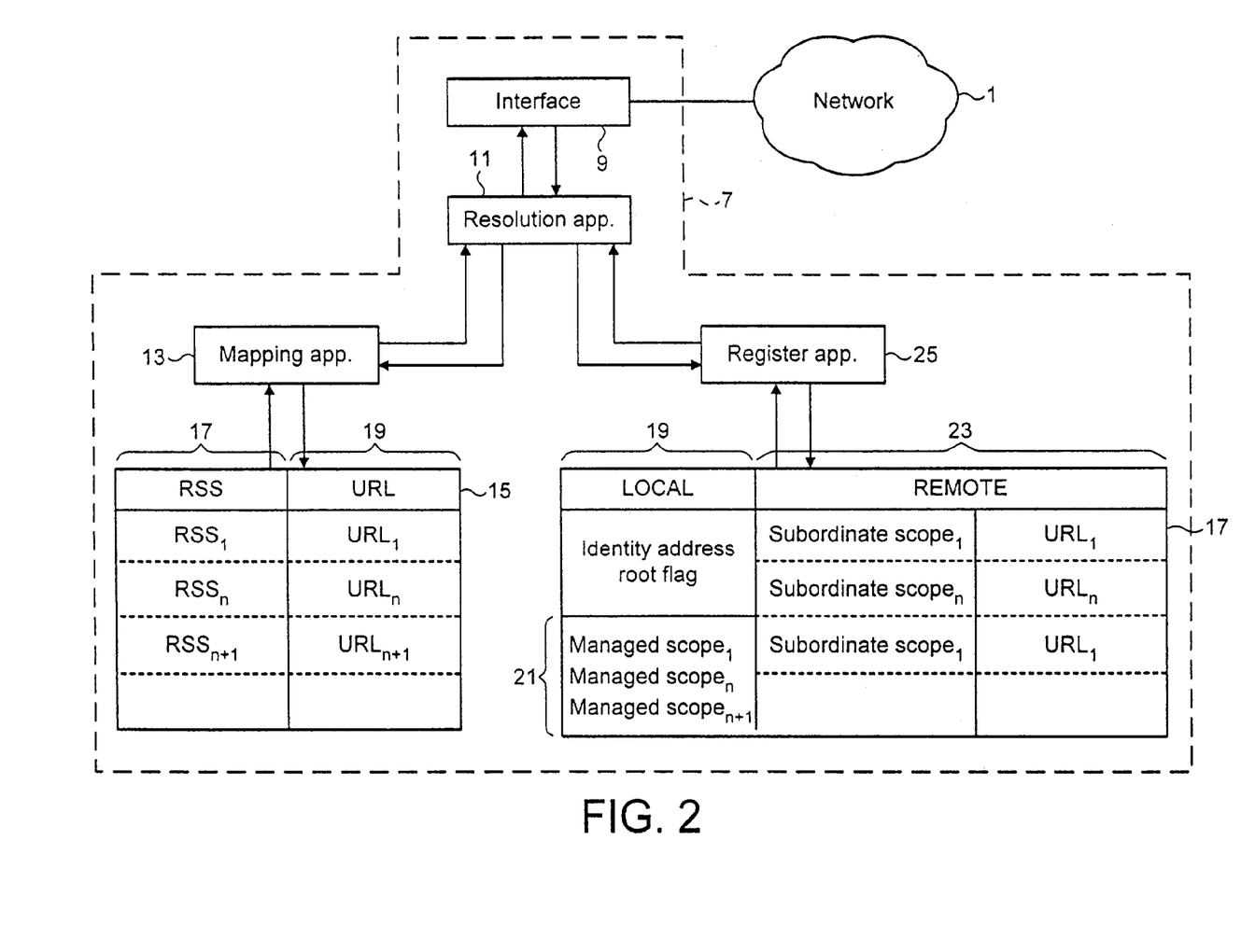
FIG. 2 is a more detailed diagrammatic view of a resource location server of FIG. 1 shown connected to a network.
Figure 3:
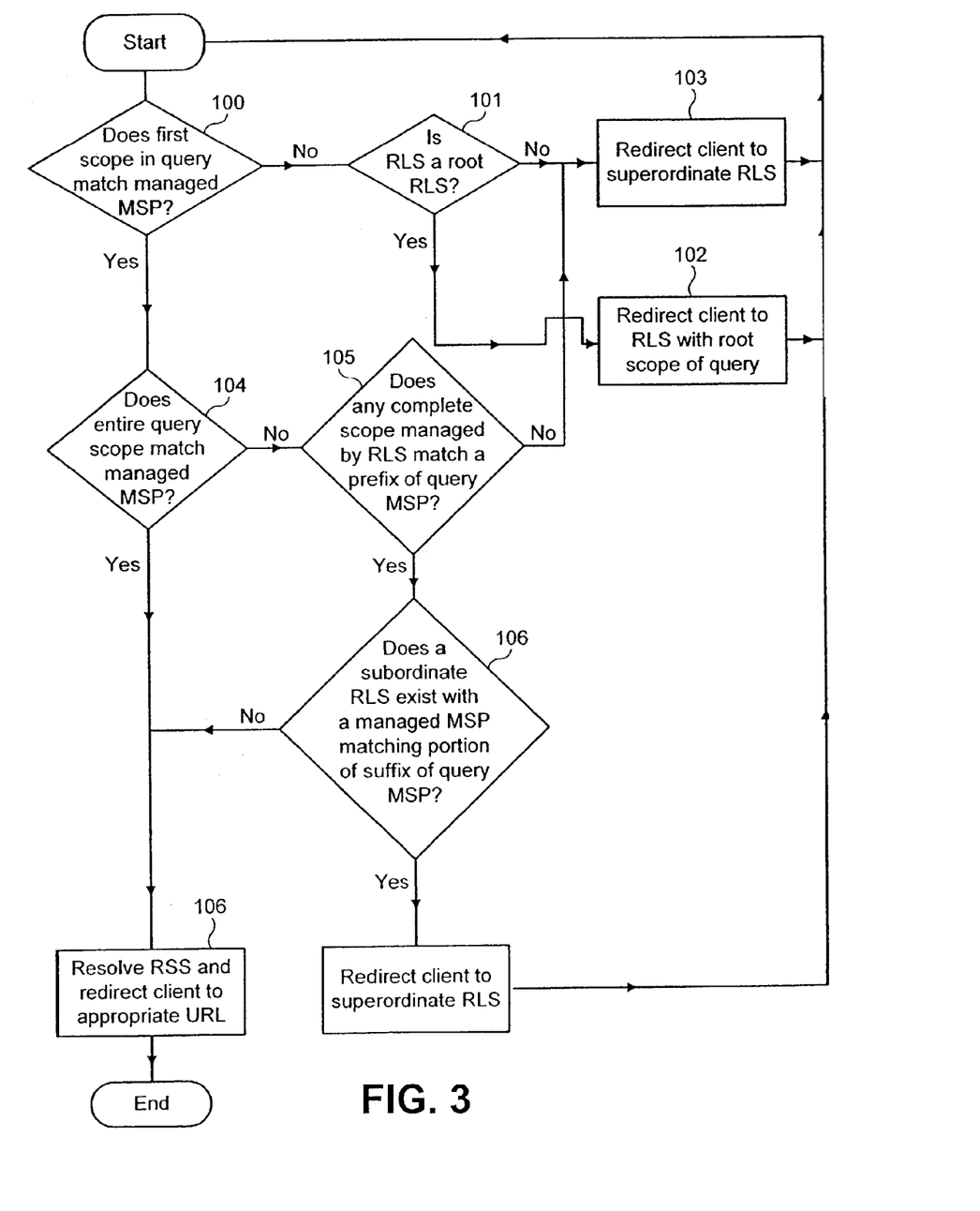
FIG. 3 is a flowchart useful in understanding a method of the invention for use in the server of FIG. 2.

Turning to FIG. 2 each RLS server 7 comprises an interface 9 capable of receiving a request for resolution of a Uniform Resource Indicator in the form of a Managed Resource Name (MRN). The MRN has the syntax "mm":{Management Scope Path(MSP)}:{Resource Specific String(RSS)}". To provide for legacy processes, the interface is also capable of receiving the request in the form of an URN namely "urn: mm:{MSP}:{RSS}. A resolution application 11, responds to such a request as is set out in more detail below.

An extract of resolution application 11 in the form of pseudocode is as follows:

IF (the first scope in the query MSP does not match the first scope in any MSP defined for and managed by the RLS)
THEN IF (the RLS is a root RLS)
THEN The RLS retrieves the address of the RLS associated with that root scope of the query MSP; and redirects the client to that RLS.
ELSE The RLS redirects the client to any of its immediately superordinate RLS.
ELSE IF (the complete query MSP is exactly equal to one of the MSPs defined for and managed by that RLS)
THEN The RLS resolves the RSS portion of the MRN to a signal URL (based on its own internal implementation and possibly selecting from among several possible URLs for that resource) and redirects the client to that URL (this allows the web server at that URL to directly interact with the client as needed for e.g. secure session invocation, content optimization negotiation, etc); or if the RSS cannot be resolved, signals an error to the client.
ELSE IF (any of the complete MSP's defined for and managed by that RLS are a proper path prefix to the MSP in the query)
THEN IF (a subordinate RLS matching the scope immediately following the intersection of its own MSP prefix the query MSP exists)
THEN The RLS redirects the client to the subordinate
ELSE The RLS resolves the RSS portion of the MRN to a single URL and redirects the client to that URL; or if the RSS cannot be resolved, signals an error to the client.
ELSE The RLS redirects the client to whichever immediately superordinate RLS has the greatest prefix intersection to the query MSP.

Each RLS server 7 further includes a mapping application 13 which, in conjunction with a table 15 provides a binding of a Uniform Resource Locator (URL) 17 to a selected one of a set of RSS 19. The URL 17 may, of course point to any suitable repository 5 on which the resource identified by the MSP and RSS 19 is resident. The mapping application 13 is responsive to requests from the resolution application 11. The table 15 itself is updated in response to instructions generated by the owners of the resources to which the RSS point.

Figure 4:
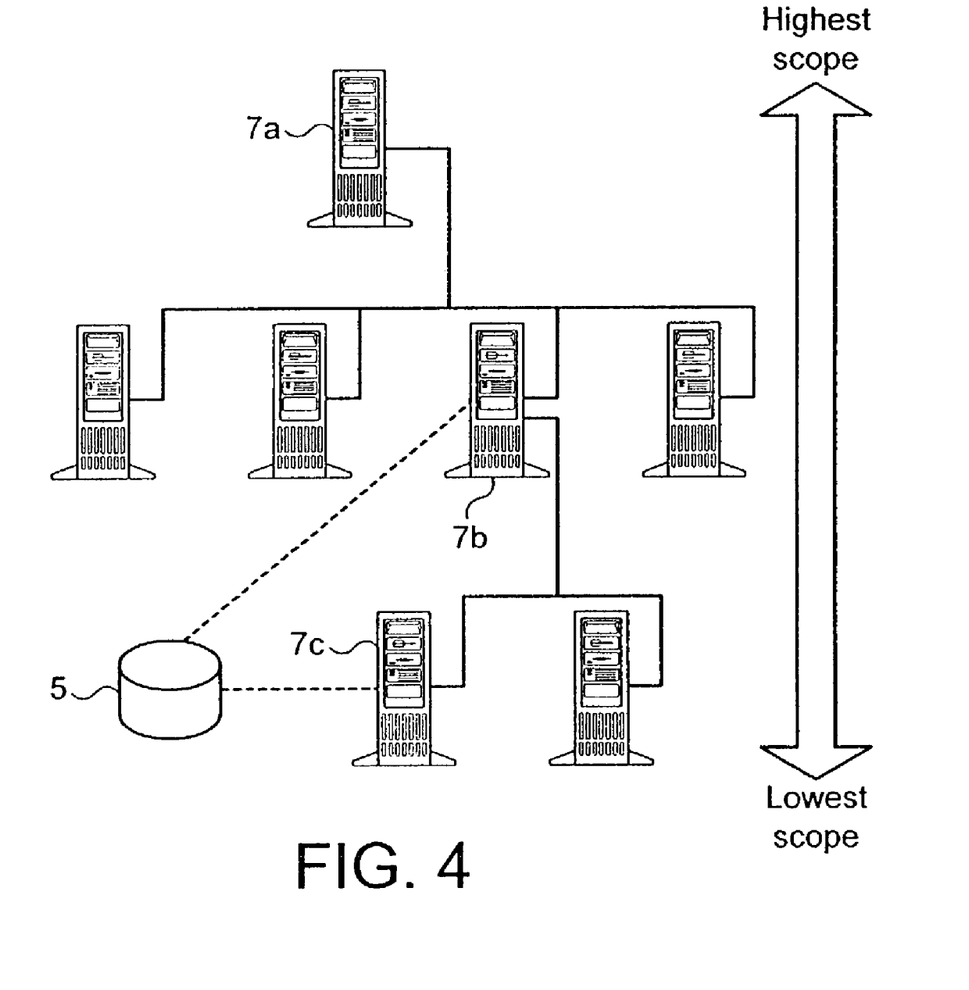
FIG. 4 is a chart illustrating relationships in scope between servers of FIG. 1.
Figure 5:
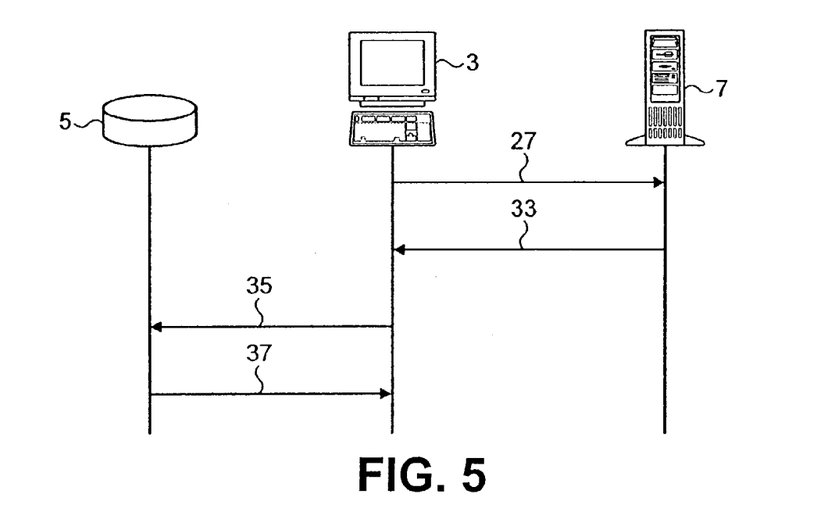
FIG. 5 is signaling diagram further illustrating the operation of the servers of FIG. 1.

In addition, each RSS server 7 includes a register 17 a portion 19 of which holds identity, network location and status information relevant to that server 7 including a flag indicative of whether the server is a root server. The register portion 21 holds details of those management paths of differing scope managed by the server 7. A further portion 23 of the register 17 holds corresponding information relating to other servers 7 responsible for immediately subordinate and superordinate management scopes as shown in FIG. 4. A register maintenance application 25 is provided both to ensure that the register 17 contains the information necessary for the resolution application 11 to operate and also to facilitate the distribution of register information amongst selected other RLS servers, the selection being based on the requirements of the resolution application 11 namely maintaining the register entries for subordinate and where appropriate superordinate RCS servers. Thus, the registry maintenance application 25 is thus responsive to requests from the resolution application 11 and updates of register information received from other RLS servers 7. In addition, the registry maintenance application 25 provides as has been previously stated details of its own identity, network location and status information to RSL servers identified in the remote register as being responsible for immediately superordinate management scopes.

Figure 6:
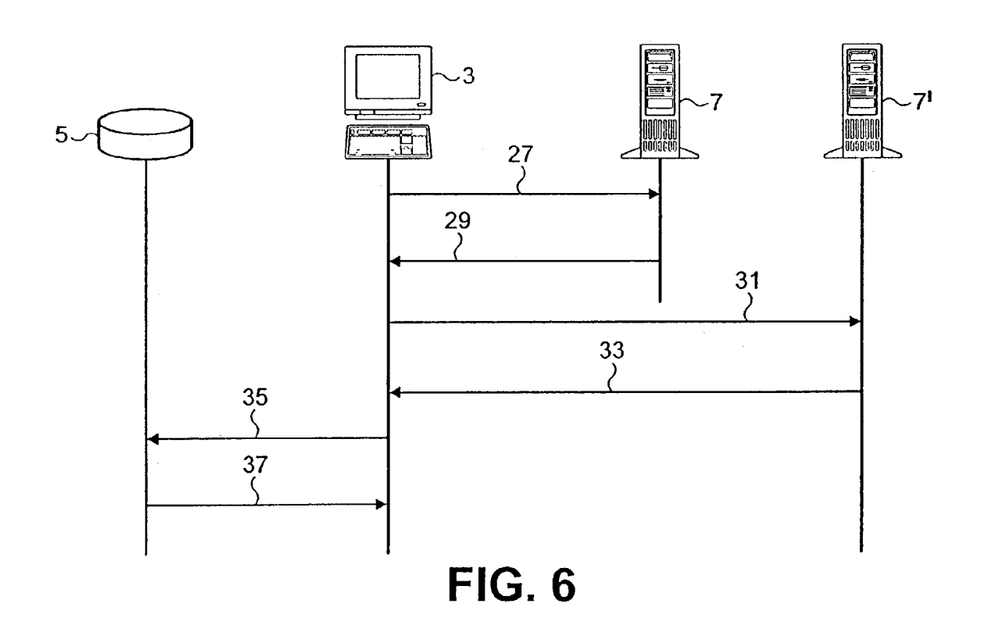
FIG. 6 is a similar view further illustrating the operation of the servers of FIG. 1.

Referring now tot the flowchart of FIG. 6 and also FIGS. 7 and 8 representing particular signal flows, the operation of the RLS server 7 in response to a query received from the network may be better understood. The query is generated at a terminal 3 by a process. For example, the query may be generated either through user interaction with a browser, or in an autonomous manner by the process substantially independent of any user input. The query is addressed 27 to a pre-selected RLS server 7 identified in the configuration settings of the terminal 3, this address being obtained by the process from the terminal operating system. The query is in the format set out above, namely an initial namespace identifier "mm"followed by a management scope path "MSP"made up of a set of domains delimited in order of reducing scope, followed by a resource specific string "RSS" which identifies a particular resource at the level of management scope defined by the MSP.

The query is received from the network via the RLS server interface 9 which passes the query to the resolution application 11. The resolution application 11 parses the query to obtain the most significant domain of the MSP. The parsing process therefore includes stripping the namespace identifier(s) from the query. The most significant portion of the path on domain is then compared 100 with a set of paths on domains 21 managed by that RLS server 7 and held in the local information portion register 17. Depending on the outcome of this comparison, the RLS server 7 may generate a re-direction request as set out in the following paragraph using known http commands and send 29 the request to the process or further parse the MSP of the query.

Where the most significant domain forming the MSP is not within the management scope of the RLS server 7 then a re-direction request is generated 29. The contents of the re-direction request 29, namely the address of the new RLS server 7 to which the process is pointed will vary depending on the status of the RLS server 7 which is obtained by the resolution process 11 from the register application 25 having access to the local information register portion 19.

The local information register portion 19 contains a flag indicative of whether 101 the RLS server is a root RLS. In the event the RLS is a root server, the register application 25 informs the resolution application which obtains from a remote information register portion 23 the address of a server 7 responsible for managing the particular scopes set out in the initial portion of the MSP query. Thus, the present RLS server 7 will provide 103 the process, in the form of the redirect request 29, with a new URL identifying the new RLS server 7 to contact. In this event, the process will issue 31 the same query to the identified RLS 7 server which will respond 33 in the manner described herein. Where the flag is not set to indicate that the RLS server 7 is a root then the resolution application 11 is provided 103 with an address from the remote register portion 23 of a superordinate RLS server in the form of a redirect request 29 which provides the process with a new URL identifying the new RLS server 7 to contact. Again, the process should issue 33 the same query to the identified RLS server 7 which will respond in the manner described herein.

In the event the most significant domain is identified from a set of managed scopes 21 held in the local information register portion 19, the resolution application 11 further parses the query. As a consequence of this further comparison 104, it is identified whether the entire scope of the query corresponds to one of said set of managed scope 21 held in the local information register portion 19. If not, the resolution application 11 identifies 105 whether any complete management scope path in the register 21 matches a most significant prefix of the query MSP with the outcomes set out below. Alternatively, where the entire scope of the query does match 106 one of the set of managed scopes 21 held in the RLS server registry 19 then the RSS portion of the query is parsed by the mapping application 13. The mapping application 13 interrogates the table 15 and obtains a corresponding URL 19 bound to the RSS 17 which is passed as a response 33 to the query to the network for delivery to the terminal 3 in the form of a re-direct request. The terminal 3, on receiving the redirect request from the RLS server directly contacts 35 the resource at the specified URL which is then made available 37 to the process.

Where a complete scope managed by the RLS server 7 does not match a most significant portion or prefix of the query MSP then the resolution application 11 provides 103 the process, via the network 7, with a redirect response 29 setting out the URL of a superordinate RLS server 7 having a greater management scope. These details are obtained for the resolution application 11 by the register maintenance application 25 which is capable of accessing the relevant portion of the registry 17 as has previously been described.

However, where a significant portion of the query scope is matched by one of the scopes managed by the RLS server then the resolution application 11 contacts the registry management application 25 to determine 106 whether the register 17 holds the address of another RLS server 7 whose scope matches the remaining least significant portion or suffix of the query MSP. If this is the case, the registry management application 25 provides the appropriate address to the resolution application 11, which address is then used to form a redirection request to be delivered 29 to the process. Otherwise, the resolution application 11 causes the mapping application 13 to obtain a URL corresponding to the RSS portion of the query. This URL is then formatted as a redirect request for delivery 33 to the process which is then able to contact directly 35 the resource. The resource is then made available 37 to the process.

Figure 7A:
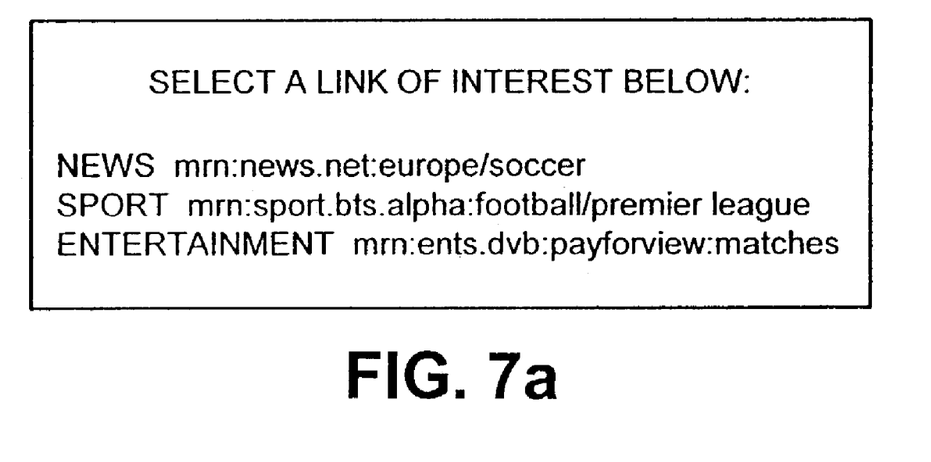
FIGS. 7a and 7b are views of example screen displays 5 useful in understanding the invention of FIG. 1.

FIGS. 7a and 7b are illustrations of typical user interfaces provided by a browser. In FIG. 7a, the browser supplies a set of links of possible interest to a user. By highlighting the appropriate link using a mouse roller or other input device (now shown), the user instructs the browser to pass the selected mm in the form of a query to the preselected RLS server 7 whose address is identified in the configuration settings of the browser.

Figure 7B:
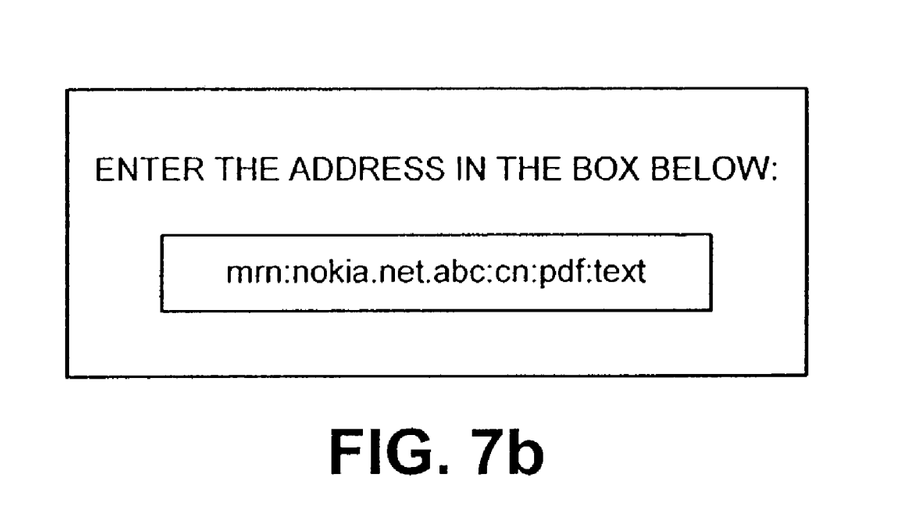

In FIG. 7b, rather than the browser supplying a list of mm from which the user selects, the user is able to enter an address directly, as shown. In a similar manner to that indicated above in relation to selection from a list, the mm query is passed to the pre-selected RLS server 7. The steps subsequently taken by the RLS server to resolve the mm query are as described above, namely the address is resolved to a data stream, which is that data located at a URL dynamically associated with the mm.

What is claimed is:

1. A resource locating system for receiving a query from a client process resident on a terminal connected to a network, the system comprising a plurality of resource location servers connected to the network, each of said resource location servers including a query resolution application to parse a query to extract a resource name and corresponding management path, a register containing a set of predefined management paths of differing scope and a table binding addresses to resource names of at least some of said predefined management paths, said register further including an address being associated with another one of said predefined management paths, the query resolution application being further configured to provide said client process with an address corresponding to one of a resource name and a predefined management path.

2. A system as claimed in claim 1, wherein the client process is provided by a browser.

3. A system as claimed in claim 1, wherein said query is delivered to a predetermined server.

4. A system as claimed in claim 1, wherein said address is provided in a Uniform Resource Locator format.

5. A system as claimed in claim 1, wherein said management path comprises a set of domains.

6. A resource location server for connection to a distributed network, the resource location server including a query resolution application to parse a query received form a terminal connected to said distributed network and thereby extract a resource name and a corresponding management path, a register containing a set of predefined management paths of differing scope and a table binding addresses to resource names of at least some of said management paths, said register further including an address of at least one other, different, resource location server, said address being associated with another one of said predefined management paths, the query resolution application being further configured in response to a query to derive an address corresponding to either the resource name or the different resource location server.

7. A server as claimed in claim 6, wherein said address is provided in a Uniform Resource Locator format.

8. A server as claimed in claim 6, wherein said management path comprises a set of domains.

\* \* \* \* \*